United States Patent
Davidson et al.

(10) Patent No.: US 6,405,797 B2
(45) Date of Patent: Jun. 18, 2002

(54) ENHANCEMENT OF FLOW RATES THROUGH POROUS MEDIA

(75) Inventors: Brett Charles Davidson, Cambridge; Maurice Bernard Dusseault, Conestogo; Mikhail Boris Geilikman, Waterloo; Kirby Warren Hayes, Lloydminster; Thomas James Timothy Spanos, Edmonton, all of (CA)

(73) Assignee: PE-TECH Inc., Cambridge (CA)

( * ) Notice: Subject to any disclaimer, the term of this patent is extended or adjusted under 35 U.S.C. 154(b) by 0 days.

(21) Appl. No.: 09/828,177

(22) Filed: Apr. 9, 2001

Related U.S. Application Data

(62) Division of application No. 09/046,762, filed on Mar. 24, 1998, now Pat. No. 6,241,019.

(30) Foreign Application Priority Data

Mar. 24, 1997 (GB) ............................................. 9706044

(51) Int. Cl.[7] ............................................. E21B 28/00
(52) U.S. Cl. ................... 166/249; 166/177.6; 166/270
(58) Field of Search ............................ 166/249, 250.02, 166/270, 177.6, 252.1, 272.6, 275, 263

(56) References Cited

U.S. PATENT DOCUMENTS 3,754,598 A * 8/1973 Halloway, Jr. .............. 166/249
5,147,535 A * 9/1992 Bernhardt ................... 210/138

* cited by examiner

Primary Examiner—David Bagnell
Assistant Examiner—Zakiya Walker
(74) Attorney, Agent, or Firm—Anthony Asquith & Co.

(57) ABSTRACT

For extracting a liquid (such as oil) from a porous medium, the liquid is subjected to pulses that propagate through the liquid flowing through the pores of the medium. The pulses cause momentary surges in the velocity of the liquid, which keeps the pores open. The pulses can be generated in the production well, or in a separate excitation well. If the pulses travel with the liquid, the velocity of travel of the liquid through the pores can be increased. The solid matrix is kept stationary, and the pulses move through the liquid. The pulses in the liquid can be generated directly in the liquid, or indirectly in the liquid via a localized area of the solid matrix.

7 Claims, 13 Drawing Sheets

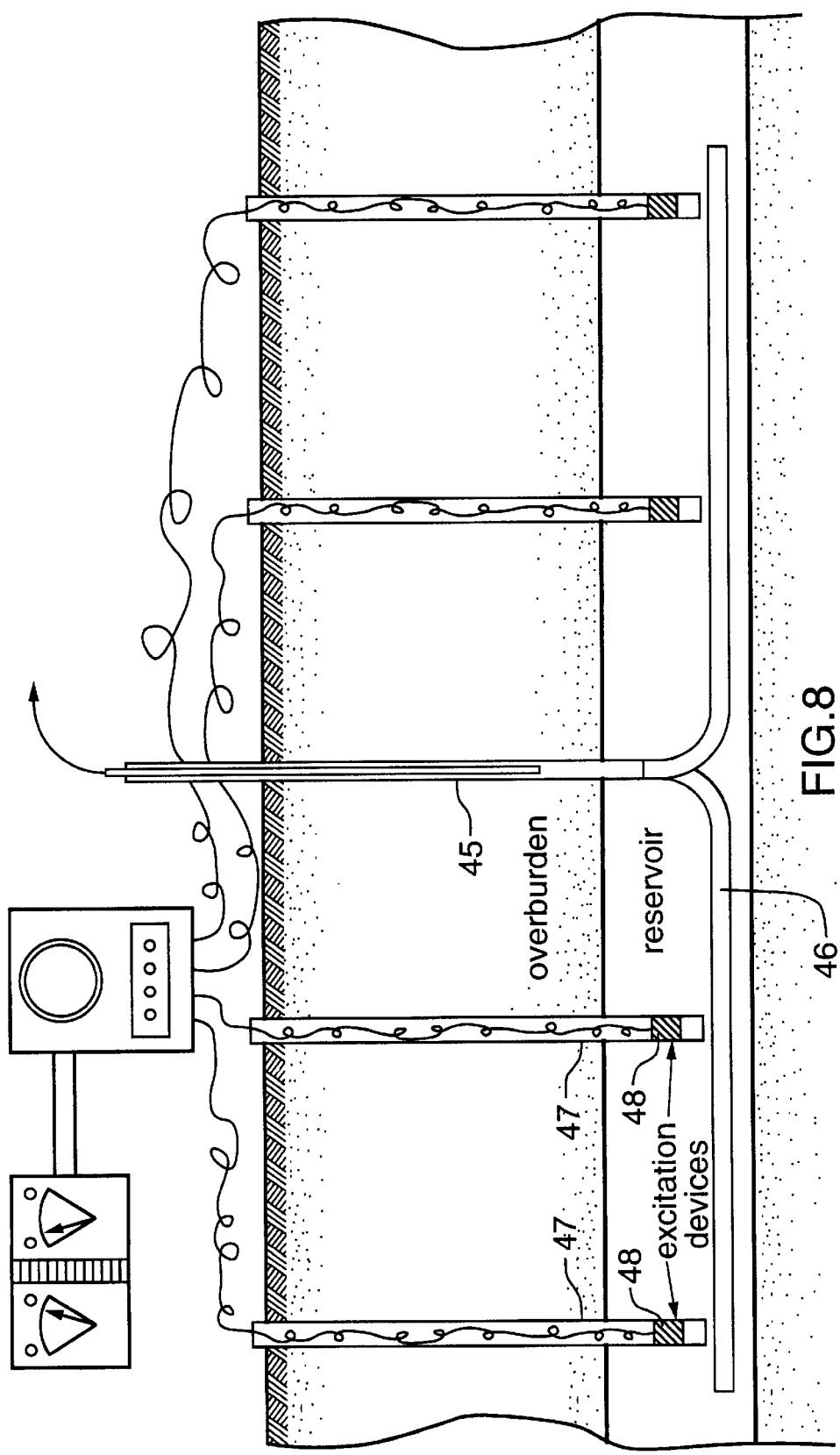

ENHANCEMENT OF FLOW RATES THROUGH POROUS MEDIA

This is a division of application Ser. No. 09/046,762, filed Mar. 24, 1998, now U.S. Pat. No. 6,241,019.

GENERAL DESCRIPTION OF THE INVENTION

This invention relates to the dynamic enhancement of fluid flow rates in a porous medium, using pressure and strain pulsing. The invention relates to devices and methods designed to explicitly enhance the flow rate of fluids (liquids or gases) and mixtures of fluids and solids (e.g. oil and sand particles) in porous media by means of application of pressure pulsing or strain pulsing to the region of flow. The pressure pulsing is applied to the liquid phase of a porous medium through periodic cycling of liquid volumes by mechanical, hydraulic, or pneumatic devices at one or more points. Strain pulsing can similarly be applied through mechanical or electromechanical excitation. The two processes are intimately linked in that a pressure pulse generates a strain pulse, and vice-versa. Dynamic enhancement of fluid flow rate can be applied to the following technologies:

Flow of liquids or liquid-solid mixtures to wellbores in petroleum or water extraction processes from porous media.

Flow of liquids or liquid-solid mixtures in porous media to wells, sumps or other pressure sinks during cleaning of contaminated shallow aquifers comprised of sand, gravel, or fractured rock.

Flow of liquids or liquid-solid mixtures in contained or natural porous media beds used for chemical engineering reaction processes, filtration, refining, cleaning, or other processes where liquids or liquid-solid mixtures are flowing from one point to another under the effect of a pressure or gravity-induced gradient.

LIST OF THE DRAWINGS

Figure 6:
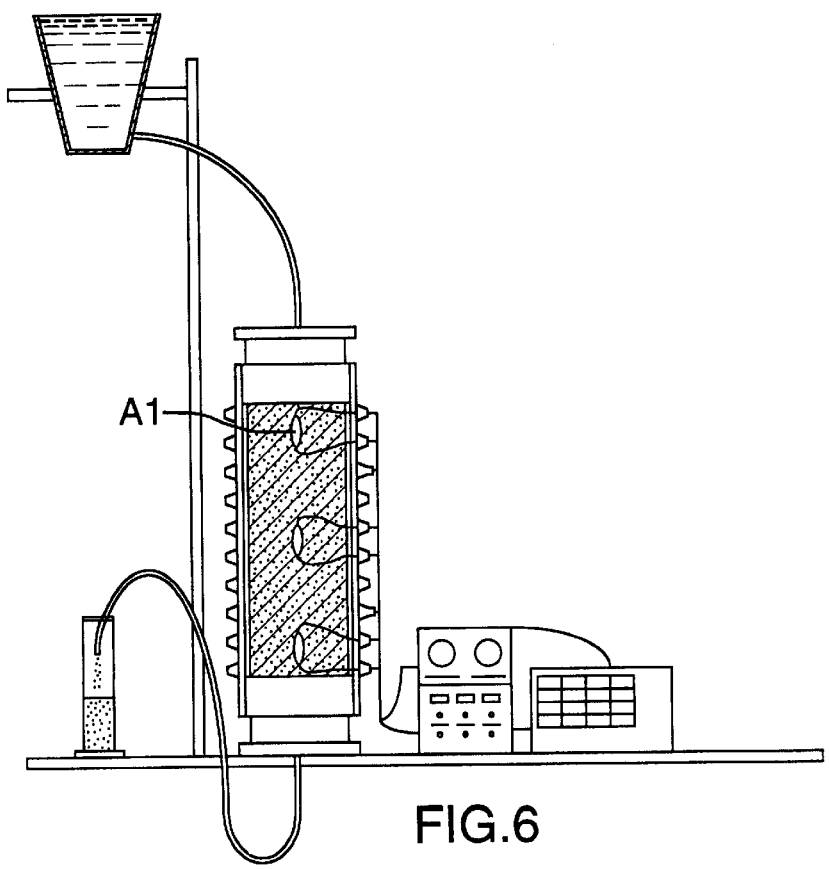

FIG. 6: Strain Pulse Flow Enhancement Apparatus

Figure 7A:
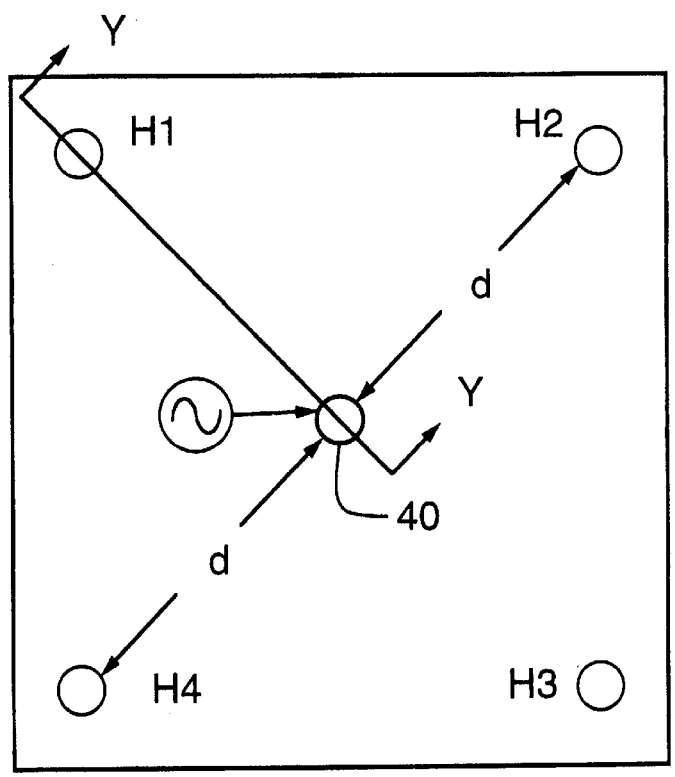
Figure 7B:
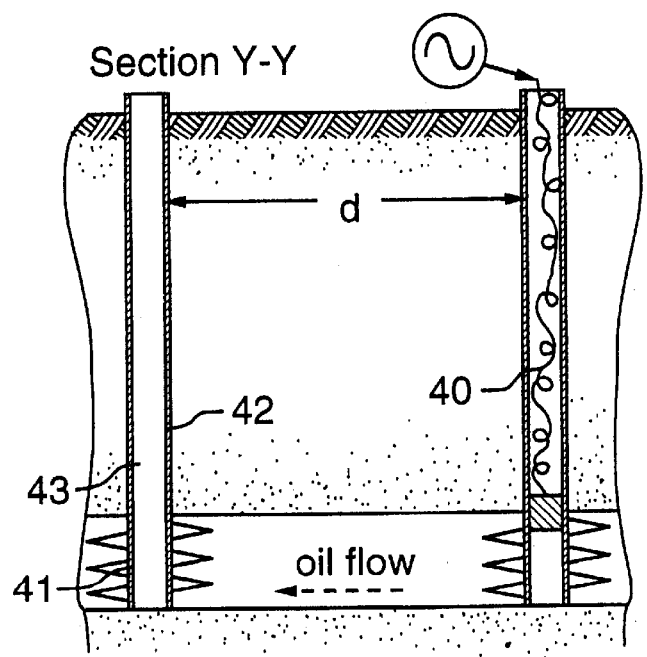
Figure 9:
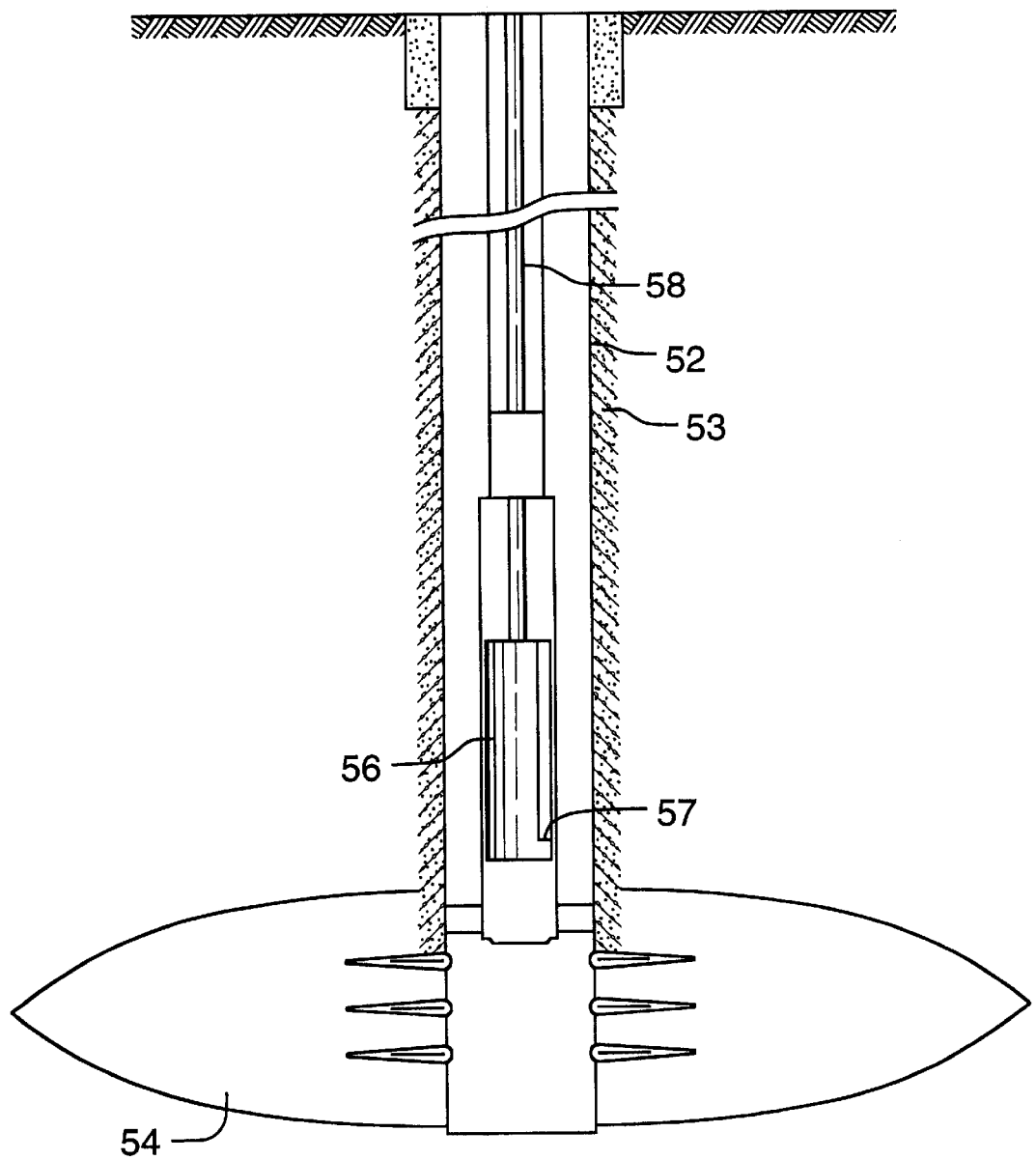
Figure 10A:
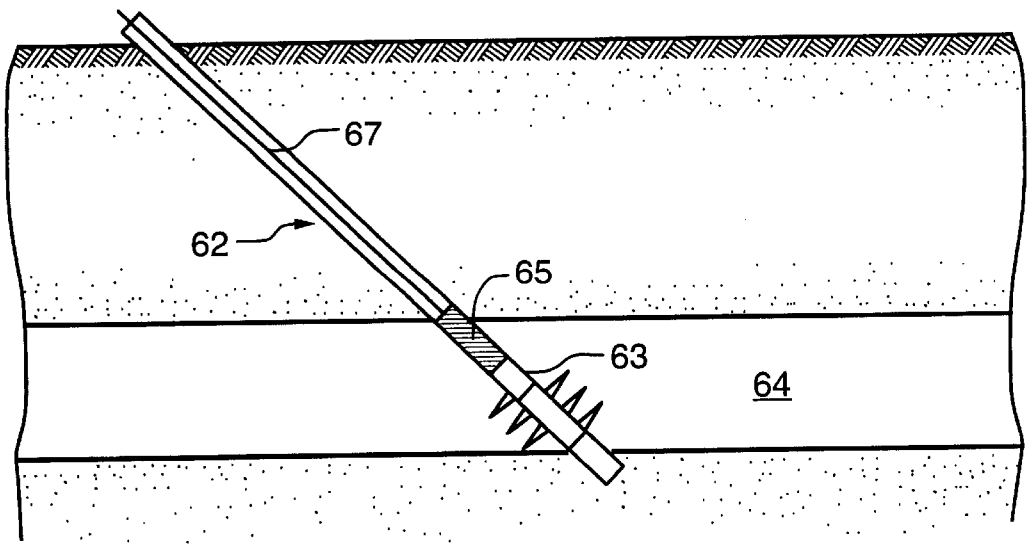
Figure 10C:
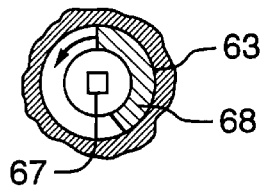
Figure 10B:
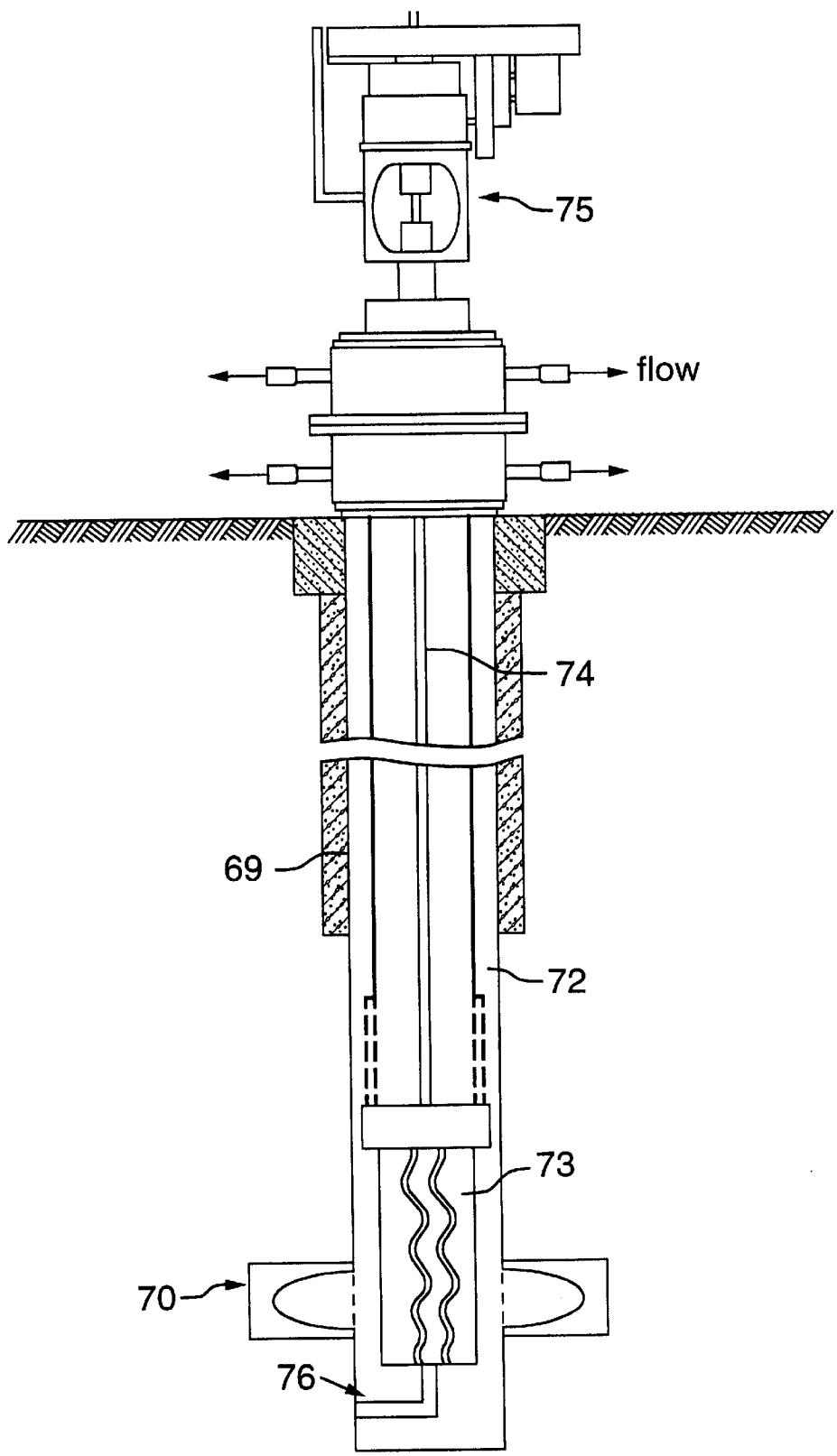
Figure 11:
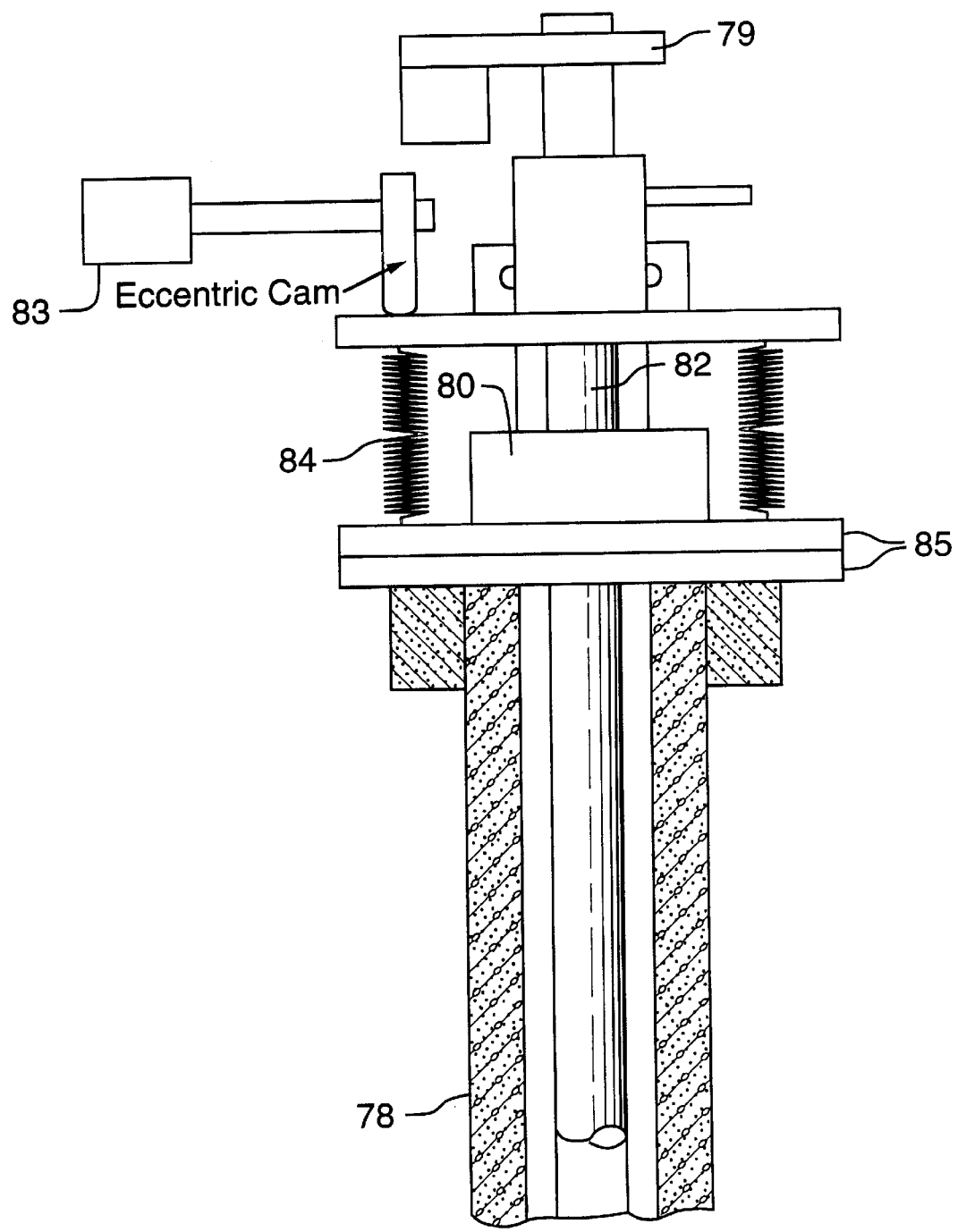
Figure 12:
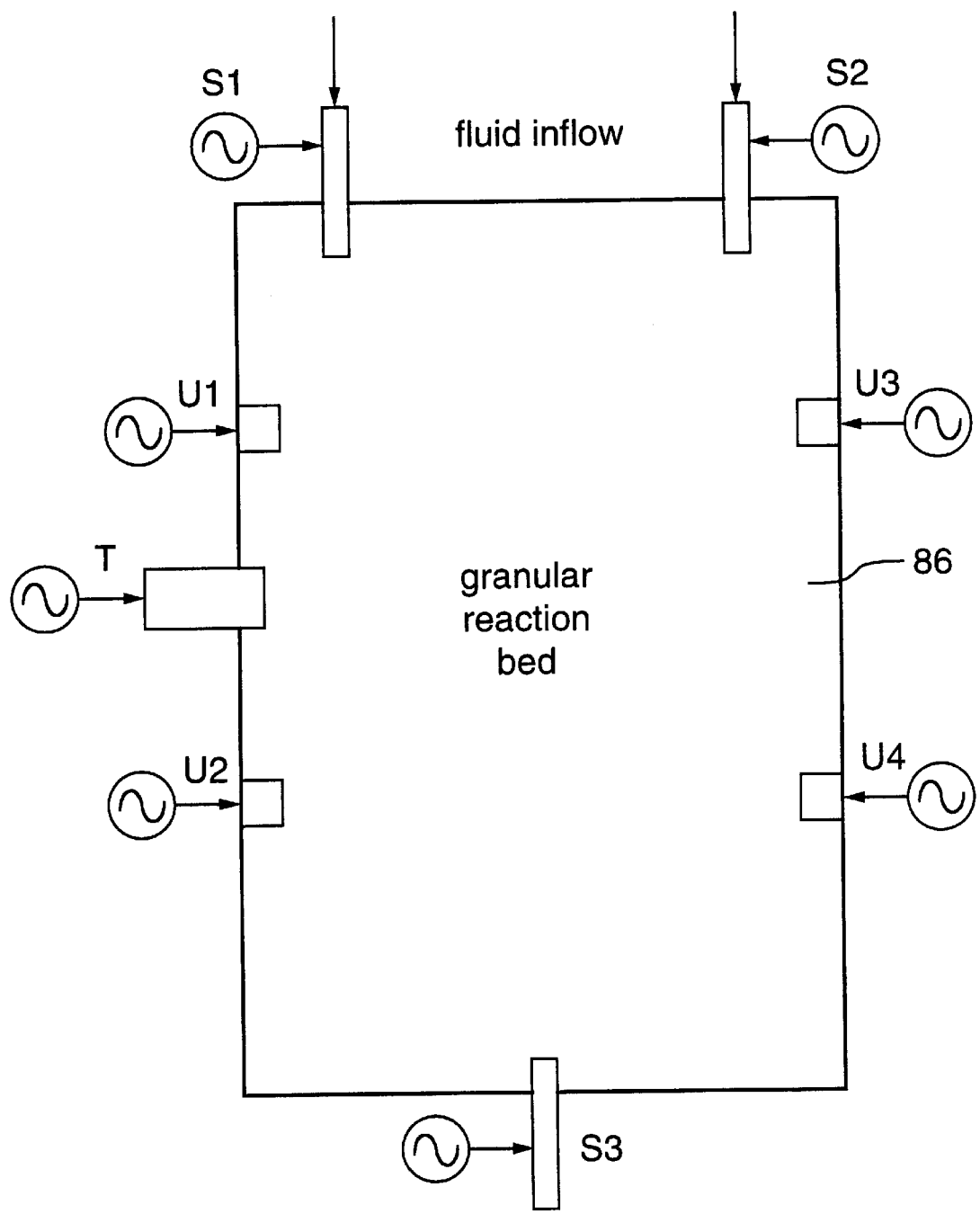
Figure 13:
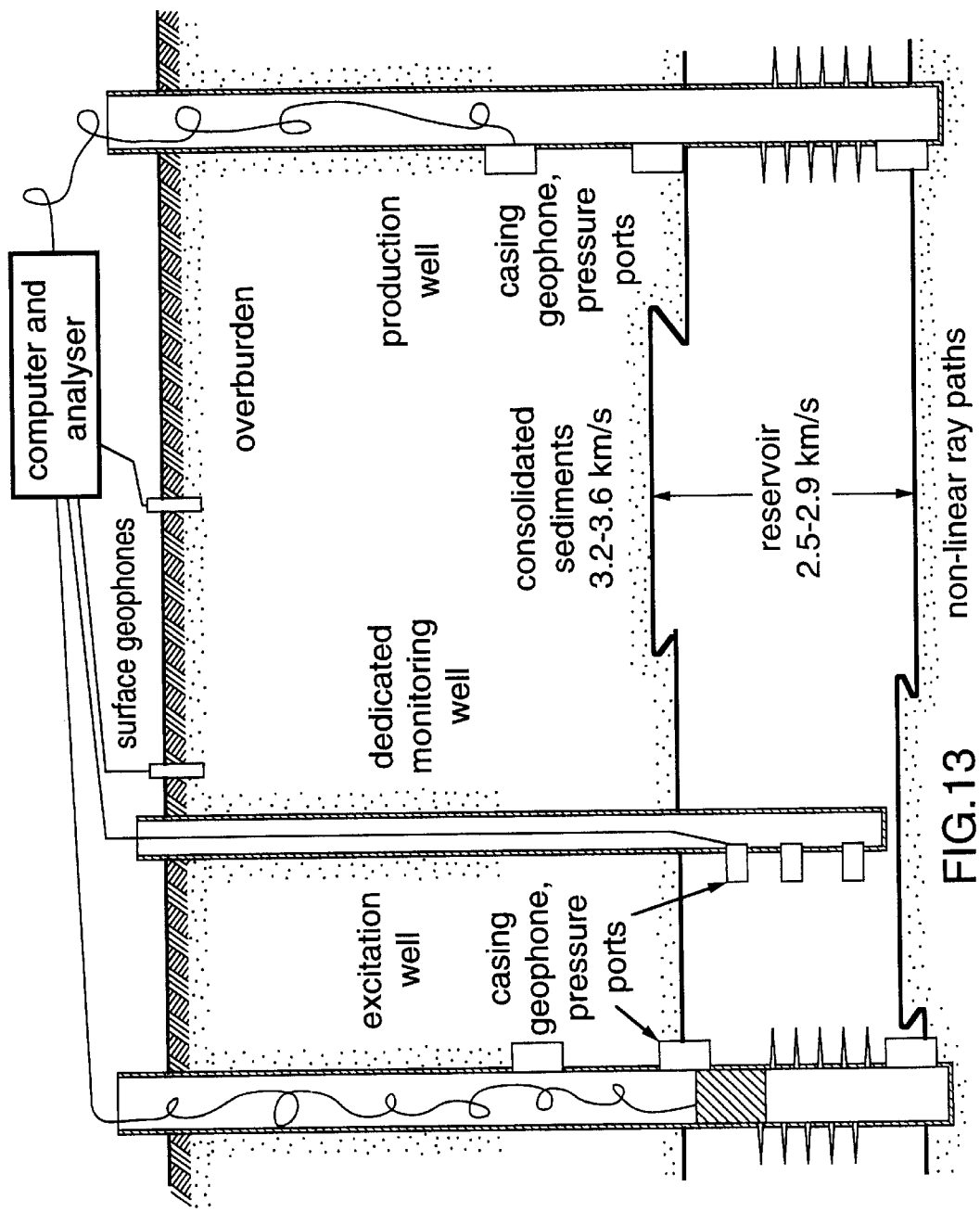
Figure 14A:
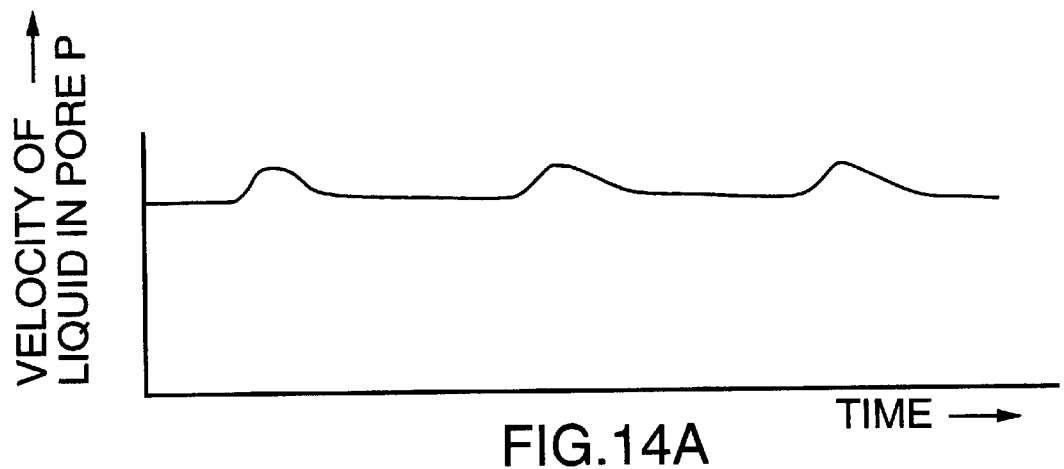
Figure 14B:
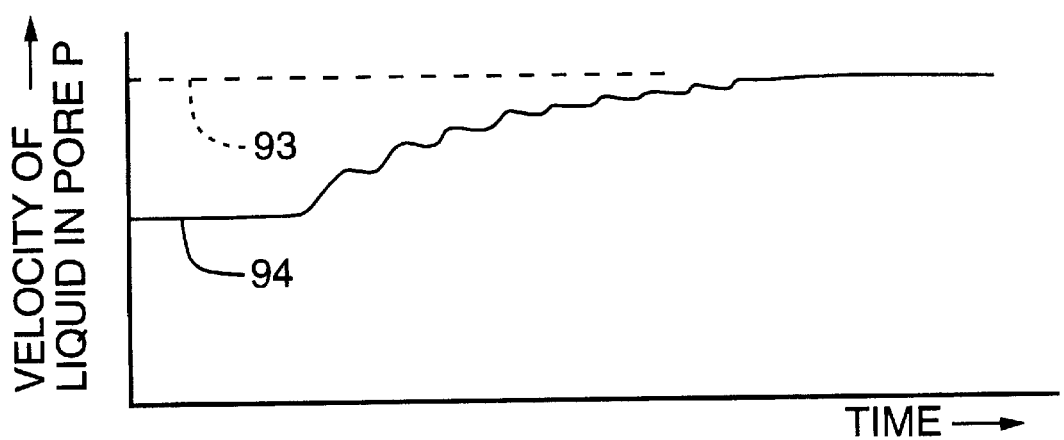

FIG. 7a is a plan view of a field implementation for oil production;

FIG. 7b is a section on line Y—Y of FIG. 7a;

FIG. 8 is an implementation of flow enhancement in horizontal wells;

FIG. 9 is a section of a pressure pulsing device;

FIG. 10a is a section of a well having a strain-pulsing device;

FIG. 10b is a section of a strain-pulsing device in a well;

FIG. 10c is a cross-section of a portion of the device of FIG. 10a;

FIG. 11 is a section of a vibrational enhancement device located at the ground surface;

FIG. 12 is a section through a reaction bed of granular material;

FIG. 13 is a section of an installation for creating pulses, producing oil, and monitoring the production;

FIG. 14a is a graph of the velocity of liquid passing through a pore in a porous medium, with pulses;

FIG. 14b is a corresponding graph to FIG. 14a, when the pulses are at a different frequency.

1 DEFINITIONS

In the context of this specification, a porous medium is a natural or man-made material comprising a solid matrix and an interconnected pore (or fracture) system within the matrix. The pores are open to each other and can contain a fluid, and fluid pressure can be transmitted and fluid flow can take place through the pores. Examples of natural materials include gravels, sands and clays; sandstones, limestones and other sedimentary rocks; and fractured rocks including fractured sedimentary rocks which have both fractures and pores through which fluids may flow. Examples of man-made porous media include filtration beds of natural or artificial granular materials or manufactured solid porous materials, as well as beds of catalysts used to accelerate reactions between fluid phases or fluid-solid phases during refining, chemical synthesis, or other processes. Structures such as tailings dikes, dams, fluid recharge or filtration beds, and so on, can be regarded as porous media.

The porosity of a porous medium is the ratio of the volume of open space in the pores to the total volume of the medium Systems of practical interest in the present context have porosities that lie in the range 5% to 60%.

The porosity (pore, fractures, and channels) is filled with fluids, which may be gases or liquids or a combination of the two. Liquids can be oil, water (with dissolved constituents), or man-made liquids such as gasoline, chlorinated bi-phenyls, polymers, and non-aqueous phase liquids deliberately or accidentally introduced into the porous medium. Gases may be natural hydrocarbons, air, carbon dioxide, or man-made gaseous products introduced deliberately or accidentally into the porous medium.

All porous media are characterized by a permeability. Permeability is an average measure of the geometry of the pores, pore throats, and other properties which describes the flow rate of fluids through the medium under the effect of a pressure gradient or a gravity force induced because of differences in density among fluid phases or solid-fluid phases.

Pressure pulsing is a deliberate variation of the fluid pressure in the porous medium through the injection of fluid, withdrawal of fluid, or a combination of alternating periods of injection and withdrawal. The pressure pulsing may be regular or irregular (periodic or aperiodic), continuous or episodic, and it may be applied at the point of withdrawal or at other points in the region of the porous medium affected by the flow process.

Strain pulsing is a deliberate variation of the strain at a point or local region in the porous medium by applying changes in strain through a device which vibrates, oscillates, or which expands and contracts in volume. The strain pulsing may be regular or irregular, continuous or episodic, and it may be applied at the point of withdrawal or at other points in the region of the porous medium affected by the flow process.

Dilational and shear pulses are the two basic types of excitation. In a dilational pulse, the perturbation is isotropic (equal in all directions) at the point of application, and may be termed a volumetric pulse. Pressure pulsing is dominantly a dilational perturbation. The dilational perturbation moves out in all directions approximately equally and is subject to scattering phenomena. In a shear pulse, a relative lateral excitation is applied so that the energy imparted to the porous medium is dominated by shear motion, such as occurs when slip occurs along a plane. Shear perturbation is highly anisotropic, and the distribution of energy depends on the orientation of the perturbing source. Shear perturbations can therefore in principle be focused so that more energy propagates in one direction than in another. Strain pulsing can be anisotropic or isotropic, depending on the nature of the excitation source.

Flow takes place in a porous medium through generating a pressure gradient in the mobile (moveable) phases by creating spatial differences in fluid pressures. Reducing or increasing the pressure at a number of points may generate this by the withdrawal or injection of fluids. It may also be generated through the force of gravity acting upon fluids of different density, such as oil, formation water, gas or air, injected non-aqueous phase liquids and other fluids. In a system where the solid particles are partly free to move, density differences between solids and fluids may also lead to gravity-induced flow.

Figure 1:
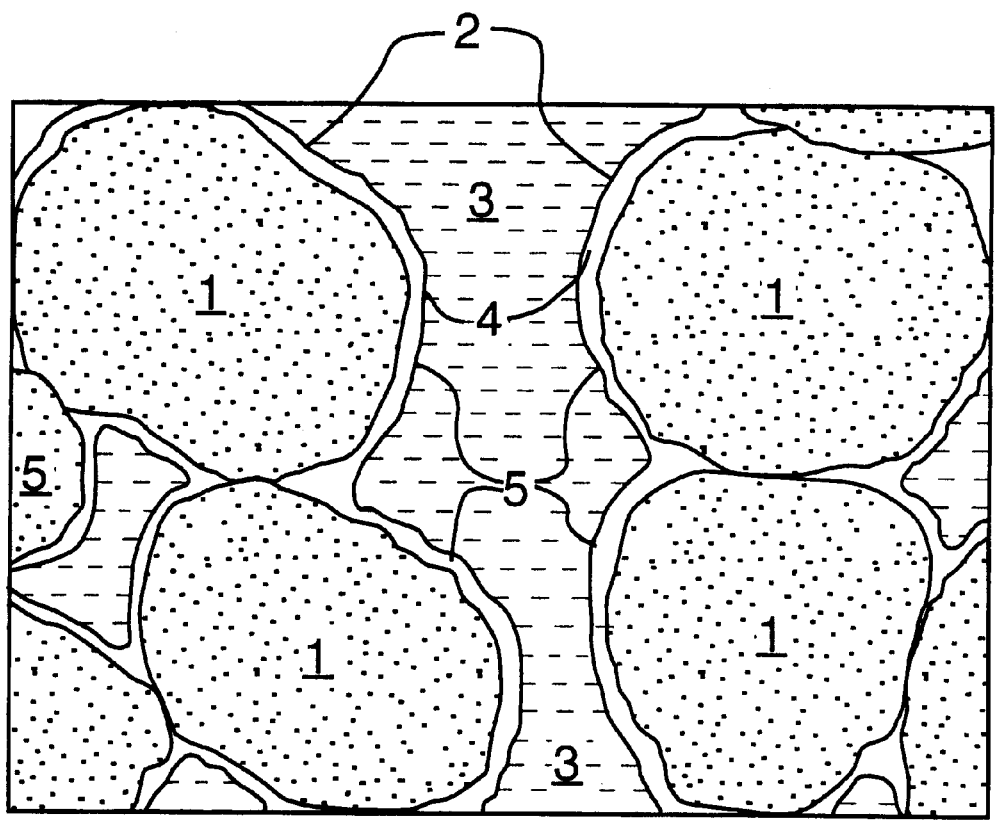
FIG. 1 is a section of a porous medium.

In a porous medium containing two or more non-miscible fluids (oil and water for example), the wetting phase is that gas or liquid which, because of surface tension and wettability effects, is in contact with the majority of the solid material. It forms the pendular fluid contacts between grains in a granular porous medium, and coats the walls of flow channels (FIG. 1). The non-wetting phase is that gas or liquid which lies in the interstices and channels and is separated from the solid material by a film of the wetting phase fluid. In FIG. 1, the mineral grains 1 are coated with a wetting liquid 2, while a non-wetting liquid 3 occupies the rest of the pore space. The pore throat dimension 4, averaged through the medium, is important in dictating the velocity at which liquid can pass through the pores 5 of the medium.

The non-wetting phase 3 might be continuous or discontinuous. If it is continuous, then an interconnected and uninterrupted path of that liquid exists in the medium. If it is discontinuous, the non-wetting phase may exist as isolated droplets or regions, which are nowhere in direct physical contact with other regions of the same phase.

2 EVIDENCE OF DYNAMIC ENHANCEMENT OF FLUID FLOW

There exist in the public literature observations of increased flow rates in oil wells and water wells during and after dynamic excitation from earthquakes or other events which can create sufficient strain in the medium to affect the porosity, and the through-flow velocity of the liquid, even in a minuscule manner.

In the systems as described herein, periodic or irregular pressure pulsing in a flowing system under a pressure gradient increases the flow rate of the mobile phase toward the extraction point.

Field observations confirm that a porosity perturbation applied to a petroleum well enhances flow to the well for some time thereafter by increasing the mobility of the fluid phase. In the case of a petroleum well producing fluid and sand, a general increase in the mobility of the complex solid-liquid-gas flowing phase takes place. The perturbation in these cases may also be a single sharp pressure pulse applied at the production well.

Theoretical developments and field observations show that fluid flow rate to a producing water well or petroleum well is enhanced if the liquid-flow-borne solids are allowed to enter the wellbore in an unimpeded manner. This is analogous to a porosity diffusion process in that a porosity change occurs as the solid phase is produced along with the liquids. This porosity change slowly propagates out from the production point into the porous medium through a diffusive mechanism, and is accompanied by changes in the pressure and pressure gradient with time and location around the wellbore. In the oil industry, the process of allowing the sand to flow unimpeded is called cold production, cold flow, or sand production.

In general, the flow enhancement accompanying any porosity diffusion process takes place in a system with a pressure gradient, and the processes preferentially increase flow rates of the mobile, non-wetting phase if more than one fluid is present as a continuous phase.

One feature of the invention lies in the recognition that dynamic excitation through application of a pressure pulse, a strain pulse, or a series of pulses anywhere in the flowing porous medium can enhance the flow rate. Fluid rate enhancement occurs at the exit points of a given system (wellbore, reaction bed, and pipeline), that are also the points of low pressure in the medium. Furthermore, we have recognised that the fluid flow enhancement can be theoretically predicted and analysed, measured in the laboratory, and physically explained.

In addition to the porosity diffusion effect and the enhancement in flow rate that it generates, dynamic excitation has several other beneficial effects on production performance of wells. The dynamic excitation may be induced as a pressure pulse or a strain pulse, generated by a pulsating or vibrating source. Excitation may be periodic or aperiodic, continuous or episodic, and applied in the stratum or at the surface, provided that sufficient porosity diffusion amplitude is transmitted to the region of interest.

The permeability of a conventional producing well can be impaired by the migration and consequent accumulation in the near-wellbore environment of fine-grained solid particles, which can pass through the pore throat constrictions in the porous medium. When, as described herein, the porous medium is being dynamically excited the tendency for these particles to bridge and block porosity is substantially reduced, thus allowing the well to maintain flowing conditions with a minimum of impairment.

Particularly in viscous heavy oils but also in some conventional oils, certain liquids (asphaltenes in general) can be precipitated as small size solid particles when the liquid encounters the lower pressures near the wellbore. These particles can accumulate in the pore throats, impairing the permeability of the system and reducing the flow rate to the producing well. Dynamic excitation, as described herein, provides cyclic strain energy aimed at mitigating the tendency for blockages of these precipitants, maintaining the well in a superior flowing condition.

Finally, under conditions where the granular particles of the porous medium are allowed to flow along with the fluids (as in sand production), the flowing particles may bridge together near the wellbore, forming a stable sand arch, and stop the solids flow. This condition leads to a massive deterioration in the fluid productivity of the well. Dynamic excitation, as described herein, provides a perturbation energy, which tends to destabilize these arches because of the small cyclic strains induced at the contacts between sand grains.

3 EXPERIMENTAL VERIFICATION

Figure 2:
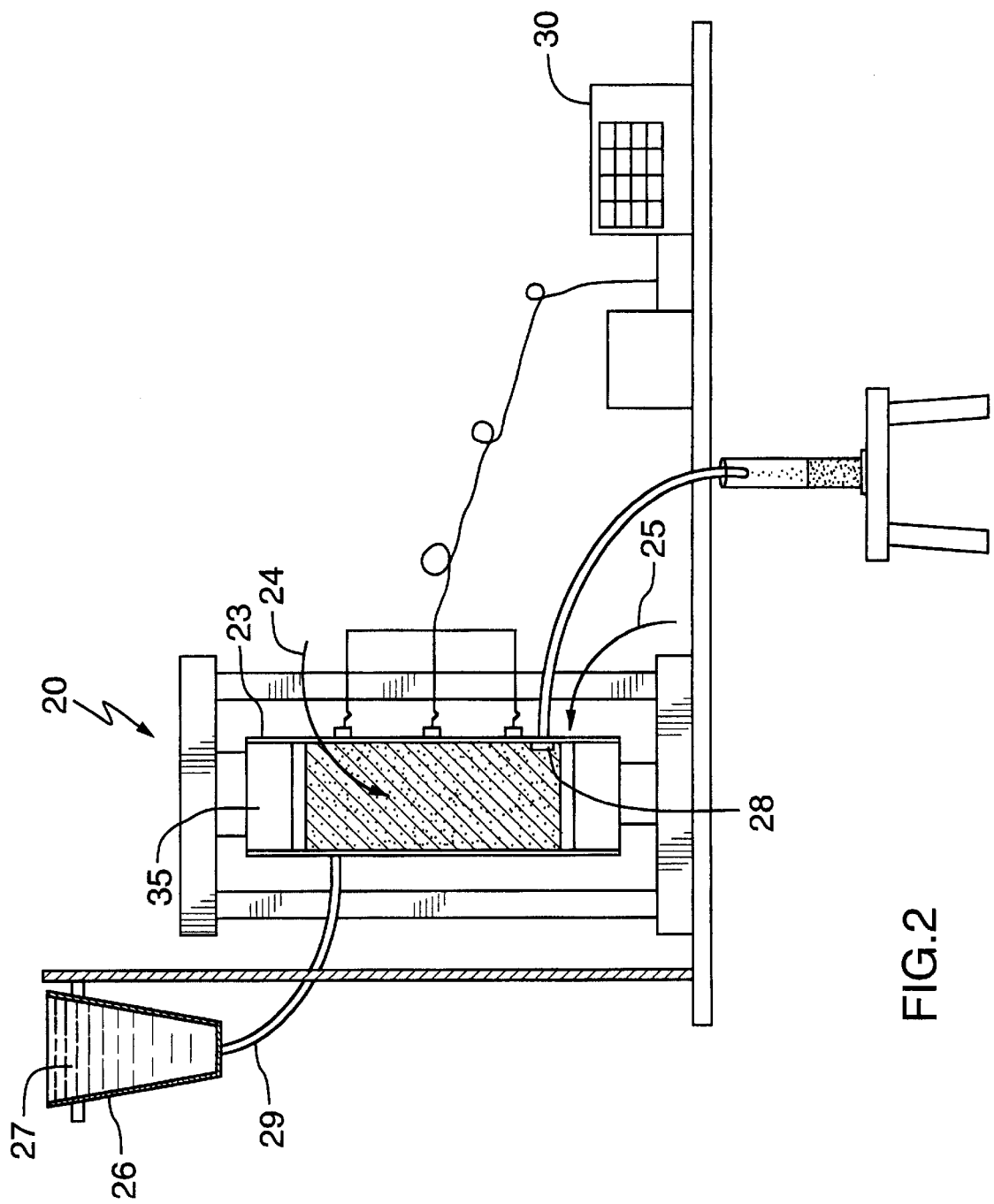
FIG. 2 is a diagram of an apparatus for demonstrating dynamic enhancement of flow rate through the medium of FIG. 1.

FIG. 2 shows an experimental set-up 20 to demonstrate the physical principle of dynamic enhancement of fluid flow. The cylindrical device 23 contains a dense sand pack 24, which is under an applied stress of 1.5 MPa. The sand pack is flushed through with paraffin oil (or any other wetting phase) to coat the grains as a continuous wetting phase. Then, glycerin (or other non-miscible liquid) is allowed to flow through the sand and form a continuous non-wetting phase that is immiscible with the wetting phase. The fluid exit port 25 allows production under the action of a pressure gradient maintained constant by keeping a reservoir 26 of the mobile non-wetting phase liquid 27 at an elevation higher than the device 23. Exit port 25 has a screen 28 between the port 25 and the sand pack 24 for experiments where the sand is not allowed to flow; however, for experiments where the sand is permitted to flow, the screen is removed.

The flow experiment is allowed to reach a condition of steady-state exit port flow rate Q. Once this condition is reached, a dynamic perturbation is applied to the system by one of two methods: a small strain pulse is applied through a transducer embedded in the sand 24; or, a periodic pulse is applied to the upstream part of the device by perturbing the flexible flow lines manually or automatically (at point 29). The varying excitation is indicated by the symbol in the circle. Pressure transducers (P1, P2, and P3) are electronic devices designed to monitor any changes in pressure in the system induced by the dynamic excitation. The sand pack 24 is maintained in compression by hydraulic pistons 35.

Figure 3:
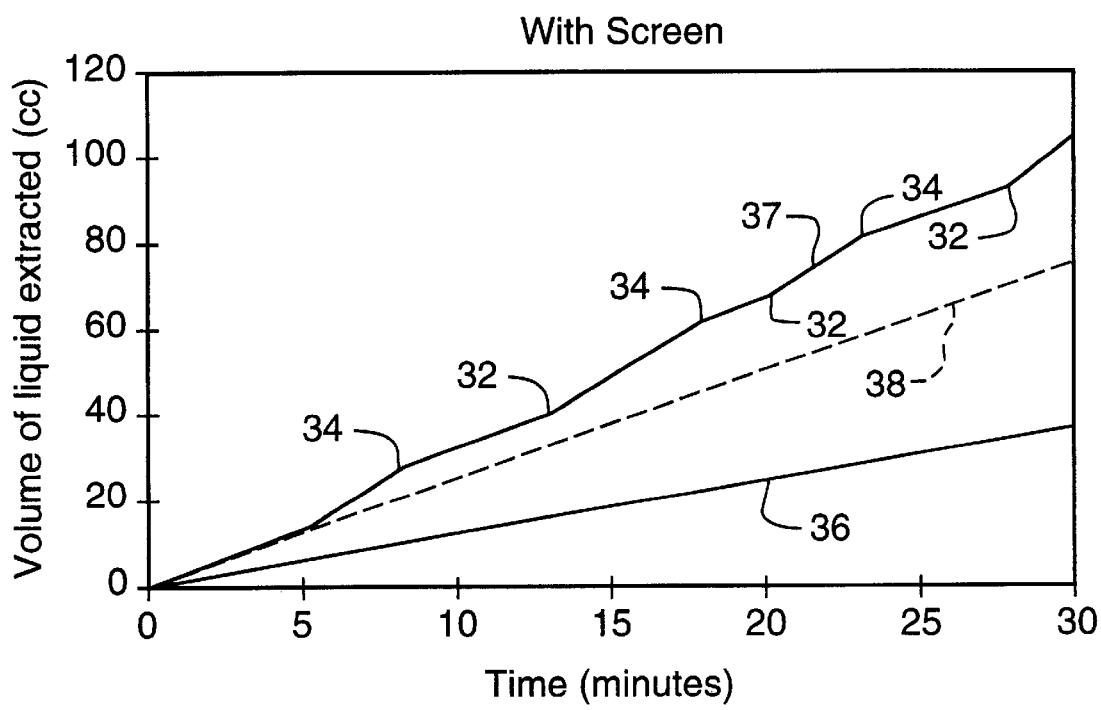
FIG. 3 is a graph of a fluid flow rate enhancement, without entrained solids.

The strain pulse is applied through a small acoustic transducer linked to an oscilloscope and signal generator 30. The acoustic transducer (not shown in FIG. 2) is embedded in the sand 24 during the assembly of the experiment. It has a diameter of 15 mm and is encased in latex to seal it from the fluid and to provide good coupling with the sand pack. Being of such small size with respect to the cell, it does not impede the flow of liquids through the experimental apparatus. The frequency of the sonic pulse was varied from 10 Hz to 60 Hz during the excitation period in the experiments. The period of excitation is indicated in FIG. 3 as pulsing-started 32 to pulsing-stopped 34. In between periods of excitation, no pulsing takes place, but flow is allowed to continue; this is necessary to evaluate flow enhancement through contrasting periods of excitation and periods of no excitation, in the same apparatus without other changes on the pressure head or flow properties.

The pressure pulsing is applied by manually squeezing the upstream flexible tube 29 connecting the fluid reservoir 26 to the top of the flow apparatus. This manual squeezing is applied at a frequency of 0.5 to 2 Hz continuously during the excitation period.

FIG. 3 demonstrates quantitatively the change in the flow rate from the experimental device. The lower line 36 is the steady flow at a hydraulic head of 0.25 meters (the top of the fluid in the reservoir was maintained at an elevation of 0.25 meters above the entry port). This line 36 is to demonstrate that without pressure or strain pulsing, no flow enhancement takes place. The upper line 37 is the demonstration of enhancement. In this case, the fluid reservoir was maintained 0.5 meters above the fluid entrance port, and one may note that the slope of the non-pulsed portions of the line 38 is almost exactly twice the slope of the lower line 36. This is in accordance with the conventional view of flow through porous media: a doubling of the hydraulic head without pulsing leads to a doubling of the flow rate.

The slope of the upper line without pressure pulsing or strain pulsing (38) is approx 2.67 cm3/min. With pressure pulsing or strain pulsing, the flow rate increases (37) to approx 5.7 cm3/min, an enhancement factor of about 2.15.

Various experiments conducted with different excitation frequencies and excitation times showed flow rate enhancement factors of from 1.5 to 2.2, demonstrating that the porosity diffusion process increases the flow rate of the mobile phase under conditions of continuous pressure or strain excitation.

Figure 4:
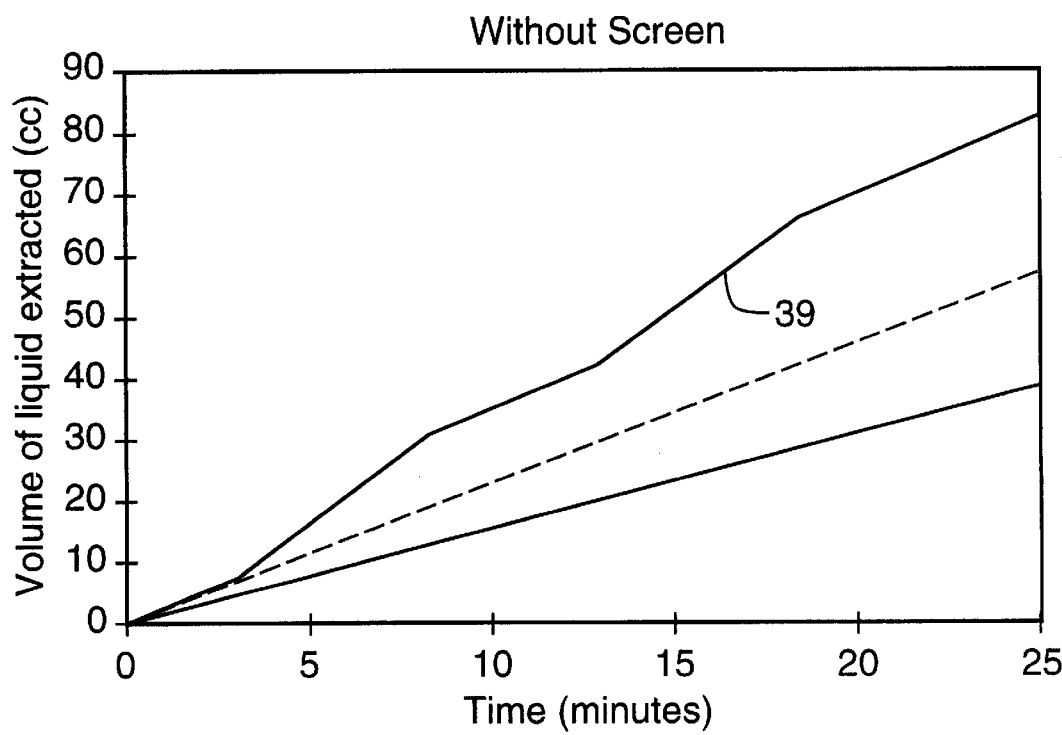
FIG. 4 is a graph of a fluid flow rate enhancement, with entrained solids.

This enhancement is also observed in a set of experiments where the sand is allowed to move from the exit port (screen is removed). Experiments where sand was allowed to exit are intended to simulate the behavior of wells producing heavy oil or other liquids by the process of sand production, discussed below in more detail. Results similar to those shown in FIG. 3 are obtained if the sand in the specimen is allowed to exit. Flow rate enhancement ratios of 2.0 to 2.5 are typically obtained. Typical results are shown in FIG. 4. The only difference in experimental set-up between this figure and the previous one is that now the sand is allowed to flow out with the fluids at the exit port.

In the sand+liquid flow experiments (screen 28 removed), it was observed that after some time the sand spontaneously stops exiting because of the formation of a stable sand arch behind the exit port 25. This blockage causes the fluid exit rate to drop to a negligible value, <0.2 cm3/min, indicating that the sand grain arch is impeding the flow of liquids. The pulsing and the strain perturbations overcame this blockage. The results therefore indicate that not only is there a basic flow rate enhancement, but also that the natural tendency of sand to create blockages can be overcome by pressure or strain pulsing, and if such blockages exist, they can be de-stabilized by pulsing. Clearly, this has substantial positive implications on maintaining free fluid and sand flow to a well producing sand and liquids.

Figure 5:
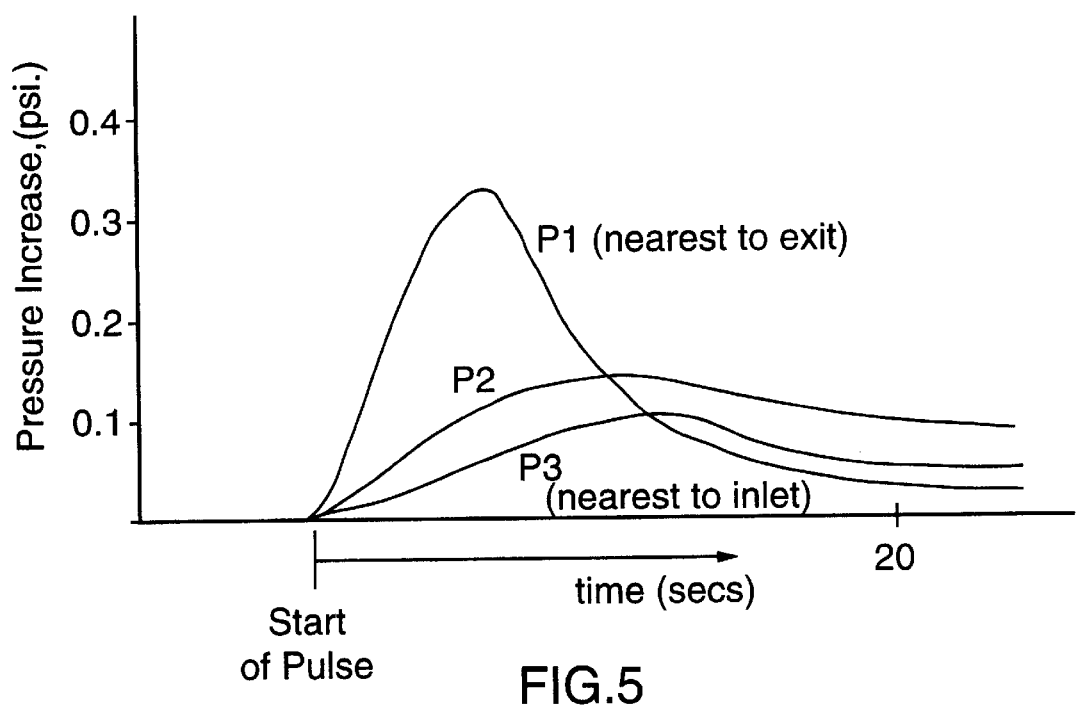
FIG. 5 is a graph showing pressure pulse transmission through the porous specimen.

FIG. 5 shows the pressure response from the three pressure transducers in FIG. 2 (P1, P2, P3) when the device is subjected to a series of continuous pressure pulses applied by manually squeezing the inflow hose at point 29. As mentioned earlier, the actual magnitude of this pressure pulse is less than 0.2 kPa, and it has no effect on the average pressure head applied to the sand pack. With continued pressure pulsing, however, the actual fluid pressure in the specimen begins to rise (the curves swing upward); this is the effect of the porosity diffusion process being built up through the continuous excitation. When the pulsing is stopped, the pressure enhancement begins to decay slowly back to its original values, but the flow rate at the exit port drops to its initial values within 2–5 seconds. This suggests that fluid flow enhancement requires continuous excitation. FIG. 5 shows that the pressure build up is less the farther away from the excitation source because the pressure build up attenuates as the porosity diffusion wave is transmitted through the system.

FIG. 6 shows details of the experimental set up where a small-embedded acoustic transducer A1 (or several small transducers) is providing dynamic excitation. This excitation is of extremely small amplitude, yet it has the same effect as the pressure pulsing: it alters slightly the pressure in the fluid phase, and also changes the stresses between the grains, which builds up the pressure in a way similar to FIG. 5. This also is a porosity diffusion process because the acoustic excitation is a small-amplitude strain wave, which leads to small perturbations in the porosity of the porous medium. Experimental data show that this process also leads to a fluid flow rate enhancement of the same order of magnitude as the pressure pulsing, and the enhancement effect can also be predicted and analysed theoretically.

4 THE PHYSICAL EFFECT IN COLD PRODUCTION WELLS

The proposed technology has wide applicability to a number of conditions and cases. However, we believe that it has particular value in the petroleum industry. Therefore, we describe in detail one production process, Cold Production (CP), which will be substantially aided by the application of dynamic pressure or strain pulsing. This detailed presentation is in no way meant to exclude any of the other possible production practices for conventional oil, heavy oil, or other fluids present in porous media. This example was chosen because it has two major aspects of the beneficial effect of dynamic excitation through pressure or strain pulsing: the effect of increasing basic flow rate, and the effect of breaking down the stable sand arches that form and tend to block oil flow.

4.1 Cold Production Mechanisms

It is best to have a clear understanding of the production mechanisms involved in the oil rate enhancement observed during Cold Production (CP) in order to understand how pressure or strain pulsing can enhance flow rates and prevent blockages through the formation of sand arches.

First, movement of the solid matrix (sand) directly increases the velocity of the fluid (oil+water+gas). Thus, sand movement increases flow velocity, enhancing production. This can be seen in FIG. 4, where the initial slope of the flow line 39 when solids and fluids are both allowed to flow is greater than for the case of no solids 37, even under the same hydraulic head.

Second, sand extraction creates a more permeable zone around the wellbore through dilation of the sand matrix from an average of perhaps 30% porosity to a porosity of 35–38% porosity. This zone grows in mean radius as more sand is produced (some wells produce in excess of 1200 cu m of sand in their lifetime). If the growth of this zone is stopped or impeded by sand blockages, flow rates will be lower. If stable sand arches form near the well perforations, the flow rates may drop to a small fraction of their values when the sand is free to flow. If these sand arches are continuously destabilized by dynamic excitation so that they cannot form in a stable manner, oil flow is not only more continuous, but it occurs at a greater rate.

Third, dissolved gas (mainly CH4) in the heavy oil exsolves gradually in response to a pressure drop. Bubble nucleation and gas exsolution is retarded in time because of low gas diffusivity in viscous oil. The gas also tends to remain as a separate bubble phase during flow toward the wellbore, and bubbles expand as the pressure drops toward the production site, giving an internal drive mechanism referred to as foamy-flow. It is believed that the foamy flow mechanism aids solids extraction and enhances fluid flow rate. The high viscosity of the oil retards gas exsolution during flow, and bubble mobility in the pores and throats is retarded by interfacial tensions. This alters permeability and enhances development of small-scale tensile stresses, which help destabilize the sand.

Fourth, asphaltene precipitation and pore throat blocking by clays or fine-grained minerals are reduced during CP because of continuous solids movement, which liberates pore-blocking materials. Regular pulsing of pressure or strain will greatly reduce the frequency of pore throat blockages, which may arise.

Oil production in CP wells can, exceptionally, be as high as 20–25 cu.m/day, although 4–10 cu.m/day is more typical. After prolonged CP, done conventionally, rates as low as 1 or 2 cu.m/day can be accepted providing that initial rates were sufficient (e.g. >5 cu.m/day) for a long enough period (e.g. 2 years) to warrant well drilling and field development. However, the systematic application of pressure or strain pulsing is expected to extend the productive life of a well, and will also increase the production rate of the well on a daily basis.

CP mechanisms depend on continued sand movement, which allows foamy oil mechanism to operate efficiently, and which allows continued growth of a disturbed, dilated, partly liquefied region around the well.

4.2 When Cold Production Stops

Some wells in Alberta have produced oil and sand stably for over 11 years, with sand flow being successfully re-established after workovers, or even during production. However, some wells are extremely difficult to maintain on stable sand production. Generally, a failure to sustain solids flow is directly related to a major drop in oil production. Therefore, re-establishment of sanding would have positive economic consequences in increased oil rates or prolonged production periods. This re-establishment can be a consequence of a continuous destabilizing of the formation, unblocking perforations, or otherwise destroying any stable structures, which may have been generated in the sand. Dynamic excitation, as described herein, is aimed at achieving these goals.

Stable sand structures are desirable, for good CP. These include: stable perforation sand arches which greatly retard fluid flow into the well; re-compaction of the sand in the near-wellbore environment; collapse and blockage of flow channels within the strata; or perhaps generation of some form of natural gravel-pack created by a natural settling around the wellbore of the coarser grains in the formation. Changes of fluid saturation leading to increases in capillary cohesion have been suggested as a common blocking mechanism. This idea suggests that gas evolution leads to increasing gas saturation near the wellbore until a continuous gas phase exists, with an apparent cohesion increase in the sand.

Little is known in detail about the actual blocking mechanisms because of difficulties in exploring the wellbore region and difficulties in laboratory simulation, and therefore there is some difficulty over a method of evaluation and implementing ameliorative measures. What methods are used have been arrived at empirically and developed through practice. To our knowledge, no one uses pressure or strain pulsing of a continuous nature during continued production.

Workovers have been used to perturb the formation and re-establish sand ingress. The conventional methods used vary from surge and swab operations to much more aggressive approaches such as Chemfrac (TM), involving igniting a rocket propellant charge to blow materials out of the perforations, as well as to shock the formation and perturb the sand. Considering the rise time and the fluid velocity, this method is probably the most effective in unlocking perforations plugged with sand and small gravel particles. However, none of these methods are continuous in nature during the production of the well.

Mechanical sand bailers on wirelines are conventionally used to clean the well of sand before replacing a worn pump. The bailer is dropped repeatedly into the sand until filled, and then withdrawn at a relatively rapid rate. This has a vibrational effect on the near wellbore area, and a swabbing effect during withdrawal. Often, after bailing, sand has flowed back into the well through the perforations, and cases have been reported of six to eight days of bailing, removing as much as 1–3 cu.m of sand; that is, 10–15 times the amount that was in the wellbore in the first place. Bailing is relatively successful in re-establishing sanding, but extensive periods of bailing are clearly to be avoided if better alternatives exist.

Injection of various chemical formulations to break capillary effects is relatively common, as is injection of several cubic meters of heated oil. These methods are thought to break any apparent (capillary) cohesion in the sand, and the outward flow is thought to reopen some perforations that may have become blocked.

Thus, although many conventional wells produce sand freely, blockages occur. The method of strain or pressure pulsing, as described herein, through the process of porosity diffusion, can provide long-term continuous production at an enhanced flow rate by activating the ambient stress field dynamically. This process can destroy small-scale stable sand arches and keep pore throats open. Blocking materials such as asphaltenes and clay particles are much less likely to plug pore throats under conditions of dynamic pressure or strain excitation.

5 FIELD CONFIGURATIONS

FIGS. 7 and 7a show an example of how dynamic enhancement through pressure pulsing can be implemented in the field. A pressure pulsing system is installed in the central well 40 of a porous stratum containing oil and water. Perforations in the steel casing 42 of the well 43 allow full and unhindered pressure communication between the liquid in the wellbore and the liquids in the pores and fractures of the porous medium. The well is completely liquid-filled between the pulsing device and the perforations, and is maintained in that condition.

A number of adjacent wells (H1, H2, H3, and H4) are producing fluids and therefore have a well pressure that is less than the excitation well 40. In other words, the pressure gradient in the porous medium is directed by the induced pressure differences so that fluid flow is toward the producing wells. FIG. 7b shows a typical pressure decline curve between the excitation well and the producing wells. The distance d between the well 40 and the producing wells 43 is dictated by the physical properties of the medium (compressibility, permeability, fluid viscosity, porosity, thickness, fluid saturation), and must be determined through calculations and field experience for individual cases. The pattern shown, or any other suitable pattern of producing wells and excitation wells, may be repeated to give the necessary spatial coverage of a producing field.

In the field, the amplitude, frequency, and waveform of the dynamic excitation can be varied to find the optimum values required to maximize the dynamic enhancement effect. Because porous media have certain characteristic frequencies at which energy dissipation is minimal, analysis, laboratory experimentation, and empirical field optimization methods (based on outflow rates at the producing wells and other monitoring approaches, discussed below) might be required to find the best set of operating parameters which maximize the dynamic flow rate enhancement. Monitoring approaches for optimizations are discussed later.

FIG. 8 shows another possible configuration for implementation of pressure or strain pulsing to enhance fluid flow to wells. For illustration purposes, suppose that a vertical well 45 is completed with a number of short-radius laterals 46, each of which is considered a horizontal well. Fluid is to be withdrawn through the well 45 with the horizontal drains. A number of excitation wells 47 are emplaced above the horizontal laterals, and pressure pulsing or strain pulsing is applied in these wells through excitation devices 48.

In both cases pulsing can be generated either through a downhole or a surface pressure pulsing which can be activated by mechanical, hydraulic or pneumatic means.

6 PRESSURE AND STRAIN PULSE DEVICES FOR OIL EXPLOITATION

FIG. 9 shows one example of a pressure pulsing device that causes a periodic pressure excitation at a controllable frequency and amplitude. The pressure pulsing can be varied in frequency (number of pulses over a time interval), in amplitude (magnitude of the pressure pulse), and in waveform (the shape of the pressure pulse). The pulsing is governed from the surface through an appropriately designed electronic or mechanical control system. The major elements of the diagram are:

a) A wellbore 50, having a casing 52, embedded in cement 53, perforated into the target formation 54.
b) A piston pump barrel 56 which, when mechanically actuated, generates a pressure pulse.
c) A one-way valve 57 to allow entry of fluid into the zone below the piston pump on the upstroke of the piston.
d) An actuating device, in this drawing represented as a rod 58 to surface within the production tubing 59 that is isolated from the casing annulus with a packer 60. This driving mechanism can be varied in frequency and stroke length (volume).

The driving mechanism for the piston pump 56 in FIG. 9 is a surface-driven reciprocal or rotary mechanical drive that creates an up-and-down motion of the piston 56. Alternatively, the driving mechanism can be an electromechanical device above the piston pump driven by electrical power. Alternatively, a surface pressure impulse can be applied through the tubing. In this case, the piston pump may be replaced by a flutter valve top-hole or bottom-hole assembly which opens and closes to create pressure surges which enter the formation 54 through the perforations, but does not affect the annulus pressure because of the packer 60.

The piston 56 may contain the one-way valve 57 to allow intake of fluid on the upstroke, and expelling the incremental fluid on the down stroke, generating the pressure pulse. Alternatively, the fluid valve 57 can be closed, and a periodic pressure impulse generated with a closed system.

As shown in FIGS. 10a, 10b, and 10c, a single well 62 is producing fluids through perforations in the steel casing 63 because the pressure in the well is maintained at a value lower than the fluid pressure in the far-field, generating a pressure gradient which drives fluids (or a fluid-solid mixture) to the wellbore 62. The examples show both an inclined well and a vertical well integrated with progressive cavity pump system for purposes of illustration only. Operational descriptions will focus on a rotating elliptical mass, but it is understood that the principles apply to other pulse-like sources of strain energy.

FIG. 10a shows a typical down-hole assembly for the application of a periodic mechanical strain to the casing in the producing formation, and the cemented casing serves as a rigid coupling system that transmits the periodic straining to the formation. The major elements of the diagram are:

a) A cased 63 cemented wellbore perforated into the target formation 64 with tubing assembly and other peripheral devices.
b) A fluid pump 65 to withdraw fluids and sand from the wellbore 62.
c) Housings and devices that couple the fluid pump 65 to the tubing and if desired to the well casing 63, through a rigid packer (not shown).
d) A system of rods 67 connecting the fluid pump to the drive mechanism.
e) A drive mechanism to give rotary action to the fluid pump and eccentric mass 68.
f) An eccentric mass 68 which is mechanically linked to the fluid pump 65 (FIG. 10c).

Installed in the wellbore is a mechanical or electromechanical device that applies vibrational energy to the casing through rotation of an eccentric mass or through volumetric straining. The device is fixed to the exterior casing 63 through conventional means, using a packer with steel contacting pads (slips) or other means whereby the vibrational energy is efficiently transmitted to the steel casing with a minimum of energy losses. A schematic cross-section of a rotating elliptical mass is given in FIG. 10c. The central square hole is stabbed by a square rod on the bottom of the power rods 67, which are rotated from the surface. As the rods rotate and thereby also activate the fluid pump 65, the eccentric mass is rotated at the same angular velocity, or else the velocity may be less or greater if a mechanical gearing device is included.

The rotation of the eccentric mass 68 creates an imbalance of force, which causes the casing 63 to apply a rotational strain to the surrounding porous medium through which the casing penetrates. The rotational strain generates an outward moving porosity diffusion wave that perturbs the liquid in the porous medium, causing an accompanying pressure pulse in the liquid. The energy thereby applied to the liquid (and entrained mobile solids) in the porous medium leads to an enhancement of liquid flow into the wellbore, irrespective of the direction of propagation of the porosity perturbation. Furthermore, the strain energy thereby applied reduces or eliminates tendencies for the material pore throats or fractures to become blocked by fine-grained particles, precipitants, or through the formation of stable granular arches. The fluid produced is removed from the wellbore through the pump 65, which in this example sits above the elliptical rotating mass, but the order of the devices may be altered. Both the pump and the rotating mass may be mechanically driven, electrically driven, or one may be mechanical and the other electrical.

FIG. 10b shows a typical down-hole assembly for the application of a periodic mechanical strain to the casing in the producing formation, and the cemented casing serves as a rigid coupling system that transmits the periodic straining to the liquid in the formation. The major elements of the diagram are:

a) A cased cemented wellbore 69 perforated into the target formation 70 with tubing assembly 72 and other peripheral devices.
b) A progressive cavity (PC) pump 73 to withdraw fluids and sand from the wellbore 69.
c) Housings and devices that couple the stator of the PC pump 73 to the tubing 72 and if desired to the well casing, through a rigid packer, not shown.
d) A system of rods 74 connecting the PC pump to a drive mechanism 75.
e) A drive mechanism 75 to give rotary action to the PC pump and eccentric mass 76.
f) An eccentric mass 76 which is mechanically linked to the PC pump.

The driving mechanism for the PC pump 73 in FIG. 10b is a surface-driven rotary mechanical drive that creates a variable frequency rotation of the rods 74, rotor, and the eccentric mass 76. Alternatively, the driving mechanism for the bottom-hole assembly can be an electro-mechanical device located above or below the rotor, and driven by electrical power.

The device that applies a large rotational strain to the casing, is an eccentric mass driver 76, which is rigidly coupled to the rotor of the pump 73. The strain is a circular impulse triggered by rotation of a mass that is located off the centre of rotation of the PC pump assembly, and it may be located above or below the rotor. To transmit the strains effective to the well casing, it is necessary that the rotating eccentric mass be rigidly coupled to the casing. This is achieved through a packer seating assembly (not shown) either below or above the PC pump, but close to the eccentric mass, so that the rotary impulse is efficiently transmitted.

FIG. 11 shows an approach to transmit periodic mechanical energy down the tubing assembly in a cased well through application of mechanical excitation at the surface. These strains are transmitted to the bottom of the well, where they may be converted to a pressure pulse, or mechanically linked to the casing to transmit mechanical strains to the liquid in the formation. The major elements of the diagram are:

(a) A cased cemented wellbore 78 perforated into the target formation (not shown).
(b) A tubing and rod assembly.
(c) A drive head 79 that rotates the rod to provide motive power to the bottom-hole fluid pump (not shown) which may be a progressive cavity pump or a reciprocating pump.
(d) A packer device 80 to allow the polished section of the tubing 82 to undergo a periodic vertical movement independent of the casing or the rods.
(e) A driving mechanism 83 of variable frequency and stroke that imparts a vertical periodic motion to the tubing 82, separate and distinct from the pump drive-head 79.
(f) A set of reaction springs 84 and a flange 85 on the wellhead to act in unison with the tubing drive mechanism 83 to give the periodic vertical movement.
(g) Housings and devices that isolate yet allow the movement of the tubing and rods to allow production from the well while tubing excitation is active.

The example shown in FIG. 11 is a rotating motor actuating the tubing through an eccentric cam, with counter-stroke reaction provided by a set of springs. A variety of other driving mechanisms can be used, including a direct mechanical linkage of a reciprocating device to the tubing (perhaps eliminating the springs).

7 PRESSURE OR STRAIN PULSING IN A REACTION BED

A reaction bed (FIG. 12) of granular or porous material 86 is used to foster chemical interaction by introducing two fluid species (liquid-liquid or liquid-gas). The pore-and-throat structure similar to that in FIG. 1 of the porous medium helps break up the two fluids into intermingled phases with a large surface contact area, which accelerates the reaction process. The solid phase may, for example, be an inert material such as silica particles, or it may be a bed of particles of catalyst or of ceramic particles coated by a catalyst. In the case of a catalyst, the use of a porous bed gives a high surface contact area between the catalyst and the reacting phases. The flow through the system is achieved either through downward gravitational flow, or through a difference in the fluid pressure between the input and exit ports. The flow in this case may be in any direction, but always in the direction of the induced pressure gradient. In the example shown, flow is from top to bottom. To increase the efficiency of the process, the flow rate of the fluids through the reaction bed should be maximized.

Fluid rate flow is accomplished through the application of pressure pulses on the reaction bed by pulsing the pressure in the liquid inflow lines (S1, S2) or exit lines (S3), or by applying pressure pulses through a port (T) or ports in liquid (pressure) communication with the permeants. Alternatively, vibrational strain energy can be applied either externally or internally (U1–U4) through the use of mechanical devices or electro-mechanical transducers. The symbol inside the small circles indicates that pulsating pressure or strain is being applied at these points.

In these cases, porosity diffusion processes and the coupled pressure-strain responses create the necessary flow enhancement effect.

8 PRESSURE OR STRAIN PULSING TO FACILITATE AQUIFER REMEDIATION

We give the example of cleaning of a potable water aquifer that has been contaminated by a non-wetting phase, which has permeated the pores and exists as a continuous liquid phase. Using strategies, which, for example, may be of similar configurations to those in FIGS. 7 and 8, and devices presented in FIGS. 8 to 10b, pump-out wells are configured to give the best areal coverage of the contaminated water reservoir. Furthermore, excitation leading to fluid flow enhancement through porosity diffusion effects at these shallow depths can be implemented as well at the surface, through the use of harmonic oscillators, for example (not shown).

The aquifer clean-up proceeds by continued pumping and can also be enhanced by the input of water or other suitable liquid or solid/liquid mixtures at the excitation wells, or at other wells installed specifically for this purpose. The key aspects in this case are the continued excitation, the continued provision of a source of liquid to account for the voidage generated by pumping the wells, and the maintenance of a pressure gradient in the aquifer that maintains flow to the low pressure production (clean-out) wells.

9 MONITORING AND OPTIMIZATION IN THE FIELD

Periodic straining or pulsing can enhance the flow rate in a porous medium. The excitation gives rise to dynamic porosity diffusion effects. Optimization of the excitation process involves determining the most effective frequency, amplitude, and waveform to be applied. Control of the excitation is applied through a controller and a power source, with an oscilloscope or other read-out device to examine the characteristics of the excitation.

In order to optimize the process, it is necessary to monitor both the excitation effects and the production rate. This is achieved through monitoring production rates using flow meters or tank gauges, and through monitoring the transmission of the excitation within the reservoir. The important excitation factors to monitor are the nature of the excitation and the nature of the waves transmitted through the reservoir, and these data are collected at a data acquisition system connected to a computer. The parameters of importance in the reservoir are the pressure and the wave trains. The pressure is monitored at a number of points through pressure ports in observation wells and excitation wells, and the wave train is monitored using geophones, accelerometers, or other suitable devices placed in observation wells, excitation wells, or behind the casing in production wells.

In order to optimize the process, the data streams are taken to a central computer where the data are plotted and correlated. Then, the parameters are optimized to allow maximization of the production rate, subject of course to the limitations of the equipment used for the excitation.

10 CRITERIA FOR SITE SELECTION

The preferred framework for field implementation of dynamic enhancement is outlined below. It is designed to answer a number of basic requirements to facilitate proper site selection, which should increase the probability of successful implementation and oil recovery.

10.1 Reservoir Porosity

The effect of vibrational enhancement is relative to the current parameters, which make economic recoverability viable. For example, porosity simply determines the amount of oil in the reservoir. It does not, in theory, play a direct role in the effectiveness of the process until large porosity values are obtained. It is suggested that for maximum effectiveness the bounds of porosity range from 18% to 35%. At porosity levels above 35% the effects dynamic enhancement becomes less cumulative, diminishing with further increases. Below about 18% (i.e oil shale), enhancement by pulsing would not be expected to occur.

10.2 Minimum and Maximum Porous Media Thickness

An aim of dynamic enhancement through application of pressure or strain pulses, as described herein, is to propagate a slow moving wave in three-dimensional space. This may be in an oil reservoir or in a system comprised of a natural or artificial porous media. For optimum operation, the preferred constraints on propagation of a continuous or episodic pressure or strains in the systems described previously are as follows:
a) For oil reservoirs and aquifers a minimum thickness of 3.0 meters to a maximum of 50.0 meters.
b) For contained reaction beds, a minimum thickness of 0.20 meters to a maximum of 1.0 meters.

10.3 Caprock

Caprock, the geomaterial that overlies an oil reservoir or aquifer, serves two purposes. First, it prevents the pressure or strain pulse from upward propagation beyond the parameters outlined in Section 10.2, and it prevents upward flow of fluid. A caprock may consist of shale, dolostone, salt (or other evaporites), very dense clays, tight limestones, and so on. The key element for a caprock in the case of pressure or strain pulse propagation is that it be of extremely low permeability (e.g salt), or have very low permeability (e.g shales, dolostone, and very dense clays). It is important to note that the propagation of the pressure or strain pulse propagates through the liquid in the porous medium. It is the elastic properties of the matrix and the mobility and compressibility conditions of the fluid, which will ultimately determine the viability of the process. If the matrix is weak, or brittle, the matrix might tend to crack and consolidate under the action of pulses that have enough energy to create the dynamic enhancement of liquid flow rate as described herein. In that case, the invention would be contra-indicated. The caprock conditions are of a secondary nature but are listed here for completeness.

10.4 Permeability

The ratio of viscosity to permeability defines the mobility of the oil in a reservoir, a contaminant in an aquifer, of fluid in a reaction bed. The range of permeability for aquifers and bed reactors preferably should be on the order of 1000 sq.cm (gravel) to 0.01 sq.cm (silt). For light oil and heavy oil reservoirs the dynamic enhancement process is viable at a range from $10^{-11}$ cm2 to $10^{-13}$ cm2.

10.5 Viscosity

The magnitude of the diffusion constant and the scale of the interaction determine the speed of the pressure or strain pulse. The diffusion constant is directly proportional to permeability divided by viscosity. From our calculations of the speed of propagation of a pressure or strain pulse without the advantage of large tectonic stresses in the earth or large hydraulically induced stresses (i.e. bed reactors) we place the cutoff at 30 API gravity. When the earth's tectonic stresses can be used as an energy source both grain slippage and fluid flow will effect the propagation speed of the pressure or strain pulse. In this case, and in the case of high hydraulic stresses, the cutoff to oils can be as low as 10 API gravity.

11 ESTIMATION OF ENHANCED FLUID PRODUCTION FROM A PULSE SERIES

It has sometimes been observed, after an earthquake, that the flow rate of liquid through a porous medium has been significantly improved, at least for a time. This has led to techniques and proposals for subjecting the porous structure to artificial seismic perturbations. However, the technique of applying pulses to the liquid in the porous medium is quite different from the technique of imparting seismic perturbations to the medium itself, being much less disruptive (and less costly). Besides, although seismic operations might open up the pores, it might happen instead that the medium consolidates and closes the pores; the system as described herein is aimed rather at pulsing the liquid (and any grains that might be entrained in the liquid) relative to the solid matrix, not at pulsing or shaking the solid matrix itself.

A quantitative estimation of the cumulative enhancement of fluid production, which is observed in porous media subjected to a periodic impulse, depends on the geometric disposition between the pulse generator and the production wellbore. Such a quantitative estimate can be achieved for an arbitrary geometry through numerical calculations based on the pressure pulse and a porosity diffusion model for earthquake sources or explosive perturbations. Those perturbations produce irreversible changes in porous media, i.e. fracture, dilatancy and compaction. Any impulse-triggered decrease of porosity leads to effective compaction, and this can squeeze an additional amount of fluid from the porous medium. From a physical point of view this mechanism is clear, and such a mechanism is known to lead to excess pore pressures and sand liquefaction during strong earthquakes.

In contrast to the irreversible compaction arising from single strong perturbations, the invention is aimed at providing reversible strains arising from continuous weak perturbations. Each perturbation (e.g. tapping or short-term cyclic straining) is assumed to be of an elastic nature which does not produce any residual, irreversible deformation, but does cause a periodic perturbation in the porosity of the system through compression and relaxation.

In the aftermath of an impact, a porous medium relaxes to the equilibrium state in a diffusional manner because the relaxation process involves flow of the viscous saturating fluid with respect to the porous skeleton. If we apply another perturbation before the proceeding one fully decays, while withdrawing the produced fluid through a port, a cumulative, synergetic effect can be achieved. A quantitative estimation of this effect for specific cases involving non-symmetric dispositions of the perturbation source and the wellbore requires extensive analytical and computer model calculations based on numerical methods. This approach, however, tends to obscure the physical logic on which the model is based.

12 FURTHER CONSIDERATIONS

An aim of the invention is to apply pressure pulses and strain pulses to a liquid in natural and man-made porous media to enhance the flow rate of the mobile fluid phases and to diminish the probability of flow-rate impairment through the internal bridging of particles. The approach has been verified theoretically, in the laboratory, and through empirical observations in field situations in the petroleum industry and for water wells. A key element is the concept of porosity waves and attendant pressure pulses, which travel through the medium by diffusional processes. To our knowledge, this phenomenon has not been previously identified in such media and considered for the purposes of fluid flow rate enhancement. Applications are envisioned particularly but not exclusively for the petroleum industry and the chemical processing industry. Also, in reservoirs contaminated by non-aqueous phase, non-wetting liquids, implementation of pressure pulsing and other means of generating porosity diffusion enhanced flow is expected to accelerate clean-up operations, and make them more effective.

The techniques as described herein should be distinguished from fluidized bed technology, in which a granular material is pulsed at such an energy level that the whole solid matrix is in a state of heaving motion. In the present case, the intention is that the solid matrix does not move, but rather that the pulses pass through the liquid while the solid matrix remains substantially stationary.

Liquid flowing through a porous medium has a flow rate, which depends on the impressed pressure differential. Within the porous medium, the velocity of the liquid, as caused by that impressed pressure differential, will vary from pore to pore, but the velocity may be averaged as a volumetric flow rate over the whole treatment volume.

Considering a pore P: if the porosity of pore P should decrease, i.e if the pore should close up, the velocity of liquid passing through that pore would go down, for a given impressed pressure differential. The porosity might go down if, for example, a grain of sand might become snagged in the pore.

The pressure pulses spread through the liquid, as a wavefront, with a wave velocity. The wave front velocity (and magnitude) will not be the same at every pore in the treatment volume. The velocity of propagation of the wavefront may be averaged over the treatment volume.

In a real porous medium, the average velocity of propagation of the wave-front will be much faster than the average flow-through velocity of the liquid. Similarly, at each pore, the velocity of propagation of the wavefront will be much faster than the velocity of the liquid travelling passing through the pore.

The pressure pulse, as it passes through a pore, causes a surge in the liquid present in the pore. As the wavefront passes, the pressure differential across the pore increases, and so the through-flow velocity of the liquid in the pore momentarily speeds up (assuming the wave-front is travelling in the same direction through the pore as the liquid). Afterwards, the pressure differential across the pore drops back, as the wavefront passes, and the liquid in the pore slows down and reverts back to the background velocity of the liquid through the pore.

If the wavefront were travelling against the liquid travel velocity, the pulse would cause the velocity of the liquid in the pore to drop momentarily, then gradually speed up again to the background velocity, as the pulse passes. In some cases, the velocity of the flow of liquid in the pore might even reverse (and back flush the pore) momentarily.

It is the sudden changes in the through-velocity of the liquid in the pore that prevents grains settling in the pore, whether the pulses cause a momentary speeding up of the liquid in the pore, or a momentary slowing down (or even reversal) of the liquid in the pore.

Thus, the pores are kept open by the surges. The sudden change in velocity of the liquid dislodges or flushes away grains that might be snagged in the pores, and prevents grains from snagging in the pores. It may be noted that an actual reversal of the flow velocity of the liquid can be especially effective, by back-flushing the pores clear. By sweeping or flushing the pores clean, the flow rate of liquid through the treatment medium can be increased; or, at the least, the rate at which the pores become clogged can be slowed.

An even more beneficial ratcheting effect also can be engineered. The pulses have a specific wave form, which includes a gradual rise in pressure, followed by a gradual fall in pressure. See FIG. 5. (The wave form at pore P might not be the same as the wave form as created by the pulse generating means.) Insofar as this pressure pulse gives rise to a change in the pressure differential across the pore, the velocity of the liquid in the pore undergoes a change that follows a similar waveform.

If the pulses are infrequent, the next (junior) pulse reaches the pore P after the earlier (senior) pulse has died away, and so each pulse of pressure has an independent, i.e non-cumulative, effect on the through-velocity of the liquid passing through the pore. This condition is illustrated in FIG. 14*a*. However, if the pulses are more frequent, the junior pulse might reach the liquid in the pore before the senior pulse is finished. That is to say: the senior-surge in the flow rate of the liquid through the pore is still present when the junior-surge in the flow rate arrives. The senior-surge in liquid flow rate is caused by the pressure differential imposed by the senior pulse, and the junior-surge in liquid flow rate is caused by the pressure differential imposed by the junior pulse.

With the arrival of the next pulse after that, the velocity of the flow of liquid in the pore is given a further incremental increase, and so on. This condition is shown in FIG. 14*b*.

The effect is repeated in all the other pores, and thus the effect is manifested as an increase in the overall flow rate of the liquid through the treatment volume of the porous medium. It has been found that the velocity of the flow of liquid through the treatment volume can be increased asymptotically to an upper limit 93 (FIG. 14*b*), which is considerably faster than the background flow rate 94 arising simply from the differential pressure imposed on the treatment volume without pulsing. That is to say: the flow rate is increased by the pulsing as if a larger pressure differential had been imposed, or as if the porosity had been increased.

Thus, not only does the pulsing as described herein tend to keep the pores clear as the changes in flow velocity flush the pores, but also the pulsing, if done at the right frequency, can increase the actual flow rate of the liquid through the treatment volume.

The frequency of the pulses should be rapid enough that a junior pulse arrives at the pore before the senior pulse has died away. On the other hand, the frequency of the pulses should not be too rapid. Too high a frequency might set up resonances in the solid matrix material, and cause the material to undergo an amplitude of movement that might cause damage. Also, the higher the frequency, the more it becomes difficult to get enough energy into each pulse to actually cause a significant pressure surge in the liquid, per pulse.

The engineer should carry out tests at the treatment site, in which the overall through-flow rate is measured for different frequencies of pulsing. The frequency should be increased (starting from about 1 Hz) until a frequency is reached beyond which no further increase in through-flow rate is achieved. Typically, that happens when the frequency of pulsing is in the range 1 Hz to 10 Hz.

The magnitude or energy of the pulses is important. If the energy of the pulses is too high, the solid matrix material can be damaged. That is to say, the matrix material should not be shaken so vigorously as to cause some consolidation of the material, which would thereby lose some porosity and permeability. The energy should be high enough, though, to make the momentary change in the velocity of the liquid passing through the pores significant.

It will be understood that, in many cases, the liquid flowing through the pores will have some sand or other solid grains entrained in the flow. The sand grains of course come from the solid material making up the matrix. The movement of the sand grains, entrained in the moving liquid, should be distinguished from consolidation of the matrix, which involves a settling movement of the matrix material.

The direction of the pulses is important. In some case, for example if the pulses are generated actually in the extraction well (as in FIG. 10*b*, for example) the wavefront of pulses propagates in the direction away from the extraction well. In that case, the change in pressure differential across the pore, due to the pulse, acts to create a momentary velocity which opposes the velocity of the liquid through the pore towards the extraction well, due to the imposed background pressure differential. It might be possible in that case, by adjusting the frequency of the pulses, actually to reduce the flow rate of the liquid through the pores, i.e to impose on the liquid such a cumulative effect upon the velocity or flow-rate that the pulse-created flow-rate opposes the background flow-rate. Of course, significantly dropping the flow-rate would run counter to the aims of the invention, and the engineer should see to it, when operating a system in which the wave-front velocity is in the opposite direction to the liquid flow-rate velocity, that the frequency of pulsing stays out of the range in which flow of the liquid towards the extraction-well might be seriously attenuated. The ratcheting of flow velocity as shown in FIG. 14*b* only applies when the pulses are travelling in the same direction as the liquid.

By correctly setting the pulsing frequency, the pulsing can be used to prevent clogging of the pores, by flushing the pores and resisting the possible snagging of grains in the pores, whether the wave-front velocity is with or against the liquid extraction velocity.

One of the dangers of using a separate excitation well to generate the pulses is the possibility of inadvertently establishing a preferred pathway through the porous material, from the excitation well to the extraction well. If that happens, the well would be finished, in that now the liquid being pulled out of the extraction well is simply the liquid being fed in at the excitation well.

A separate excitation well is useful in that the engineer will find it easier to create the type of pulses that will make a significant difference to the flow rate of the liquid if he not only provides a separate excitation well, so that the direction of the pulses reinforces the flow-rate of liquid towards the extraction well, but also if he injects a (small) charge of liquid into the excitation well with each pulse. Injecting a charge of liquid at each pulse delays the drop-off or fall-back of flow-rate velocity after the pulse passes, which makes it easier to achieve the ratcheting of the pulses that can create a significant improvement in flow rate.

However, as mentioned, when using an excitation well, the engineer must make sure he does not kill the production well. It is recognised that the pulses can be made to travel considerable distances through the porous medium; sufficiently far indeed that the excitation well can be placed far enough away that the danger of killing the well becomes negligible, and yet the pulses can be made to penetrate large distances into the porous medium.

It is emphasised that the pulses are pulses of pressure passing through the liquid; the pulses do not require the solid matrix material to move. (Of course, if the liquid pressure changes, a pedant might argue that the solid matrix must undergo distortions corresponding to the change in pressure, if only very slightly. But the invention is concerned with real practical effects, and the pulses as described herein can, as a matter of substance, be generated, and can perform the useful function as described, even if the solid matrix notionally did not move at all.)

In the case where the pulses are generated as pressure pulses, the pulses are generated by creating motion directly in the liquid; in the case where the pulses are generated as strain pulses, the pulse is first applied to a local region of the solid matrix material, and only indirectly thereby to the liquid. In that case, the solid matrix material undergoes, or might undergo, a measurable strain in launching the pulse into the liquid. However, such a strain would be very localised, as to the distance of penetration of the strain into the porous medium, whereas the pulse that such strain creates in the liquid would then penetrate much further into the porous medium, through the liquid.

What is claimed is:

1. A procedure for increasing the permeability of the ground-material around a borehole in the ground, wherein the procedure includes:

first ensuring that the pores of the said ground-material are saturated with liquid, and the liquid is under a head of pressure, and is coherent with liquid inside the borehole;

then applying perturbations to the ground-material, and continuing to apply same for a substantial period of time;

wherein, in respect of each perturbation:

the nature of the perturbation, as applied, is such as to create, in respect of each perturbation, a corresponding porosity-pulse in the ground-material;

the porosity-pulse comprises a momentary physical deformation of the ground-material, and the said physical deformation is manifested as an increase in the porosity of the ground-material;

the perturbation is strong enough that the said physical deformation, being the increase in porosity, is substantial;

the perturbation is weak enough that the said physical deformation, being the increase in porosity, can be accommodated within the elastic limit of the ground-material, being not so strong as to produce any irreversible residual deformation of the ground-material.

2. A procedure of claim 1, which includes, in respect of each perturbation, applying the perturbation in the form of a pulse of increased pressure applied directly to the liquid in the borehole, in such manner that the pulse of increased pressure propagates out from the borehole into the ground-material, and the strength of the pulse of increased pressure is such as to give rise to a corresponding pulse of increased porosity of the ground-material, and the pulse of increased porosity propagates, through the ground material, away from the borehole.

3. A procedure of claim 2, wherein the nature of the ground-material, and the nature of the applied pulse of increased pressure, are such that the pulse of increased porosity comprises a gradual increase followed by a gradual decrease in the porosity of the ground-material;

and the procedure includes applying the pulses of increased pressure at such frequency that a new pulse of increased porosity is started applied before the previous pressure pulse has quite died away.

4. A procedure of claim 1, wherein:

the pulse of increased porosity of the ground-material has a characteristic speed of propagation through the ground-material, the speed being a property of the elastic constant of the ground-material as modified by the presence of the liquid saturating the pores thereof;

the pulse of increased pressure in the ground-material has a characteristic speed of propagation through the ground-material, and the pressure-period is a property of the elastic constant of the liquid saturating the pores of the ground-material;

the said propagation speeds are substantially independent of the amplitudes of the pulses, so long as the amplitudes are below a limit characteristic of the elastic properties of the ground-material;

the procedure includes applying the perturbation in such manner that the amplitudes of the pulses consequent upon the applied perturbation are below the said limit.

5. A procedure of claim 4, wherein:

the ground-material in which the procedure is carried out is ground-material in which the propagation speed of the pulse of increased porosity is similar to the propagation speed of the pulse of increased pressure;

whereby the pulse of increased porosity and the pulse of increased pressure reinforce each other as they propagate through the ground material.

6. A procedure of claim 2, wherein:

the nature of the ground-material is such that each pulse of increased pressure applied to the liquid in the borehole gives rise to a gradual increase followed by a gradual decrease in the pressure of the liquid in the ground-material;

the procedure includes applying the pulses of increased pressure to the liquid in the borehole at such frequency that the pressure of the liquid in the ground-material starts to rise, due to a newly-applied pulse, before the pressure of the liquid in the ground-material, due to the previously-applied pulse, has quite died away.

7. A procedure of claim 1, including:

providing, in the borehole, a body of a solid material;

in respect of each perturbation, applying the perturbation by applying a mechanical impact to the body of solid material, in such manner that the perturbation is transmitted to the ground-material, and is such as to give rise to a corresponding pulse of increased porosity of the ground-material, and the pulse of increased porosity propagates, through the ground material, away from the borehole.

* * * * *